United States Patent
Margittai et al.

(10) Patent No.: US 6,781,588 B2
(45) Date of Patent: Aug. 24, 2004

(54) TEXTURE ENGINE MEMORY ACCESS SYNCHRONIZER

(75) Inventors: Gavril Margittai, West Vancouver (CA); Zeev Sperber, Zichron Yaakov (IL); Gabi Malka, Haifa (IL)

(73) Assignee: Intel Corporation, Santa Clara, CA (US)

(*) Notice: Subject to any disclaimer, the term of this patent is extended or adjusted under 35 U.S.C. 154(b) by 74 days.

(21) Appl. No.: 09/964,802

(22) Filed: Sep. 28, 2001

(65) Prior Publication Data

US 2003/0063092 A1 Apr. 3, 2003

(51) Int. Cl.$^7$ ................................. G06F 13/18
(52) U.S. Cl. ................. 345/535; 345/506; 345/552; 345/572
(58) Field of Search ................. 345/506, 535, 345/501, 502, 534, 570, 501.2, 534.5, 552, 582, 572, 629, 643

(56) References Cited

U.S. PATENT DOCUMENTS

| | | | | |
|---|---|---|---|---|
| 6,333,744 B1 | * | 12/2001 | Kirk et al. | 345/506 |
| 6,389,504 B1 | * | 5/2002 | Tucker et al. | 711/100 |
| 6,426,753 B1 | * | 7/2002 | Migdal | 345/506 |
| 6,618,053 B1 | * | 9/2003 | Tanner | 345/552 |

* cited by examiner

*Primary Examiner*—Kee M. Tung
(74) *Attorney, Agent, or Firm*—Kenyon & Kenyon

(57) ABSTRACT

An arbitration mechanism for balancing memory requests issued by parallel texture pipelines in a multiple pipeline texture engine. The mechanism ensures that, as polygon textures are processed by a texture engine, all of the memory requests associated with a portion of a given graphics texture are issued by all texture pipelines before any texture pipeline may issue a memory request for another portion of a graphics texture. Thus, the invention balances graphics texture processing between parallel texture pipelines operating together, thereby improving processing efficiency and preventing deadlock conditions.

3 Claims, 5 Drawing Sheets

TEXTURE ENGINE MEMORY ACCESS SYNCHRONIZER

BACKGROUND OF THE INVENTION

The present invention relates to performance enhancement and deadlock prevention in a multiple texture pipeline graphics processor. More specifically, the invention relates to a method and apparatus for balancing and synchronizing the memory requests issued by multiple parallel texture pipelines. As polygon textures are processed by a texture engine, a memory request arbitrator ensures that all of the memory requests associated with a portion of a given graphics texture are issued by all texture pipelines before any single texture pipeline may issue a memory request for another portion of a graphics texture.

Many prior art computer graphics devices have the ability to display polygons with two-dimensional texture images ("textures") mapped onto them. These textures give graphics objects a realistic or life-like appearance. For example, a texture may be a picture of a brick facade for application to a collection of polygons that together represent the three-dimensional framework of a house. Or, alternatively, a wood grain texture may be applied to a collection of polygonal objects that together form the shape of a desk.

As is known, a graphics processor may be organized as a pipeline in which each pipe section performs a sequence of processing steps. As a whole, these individual pipe sections generate picture images composed of graphics objects. Each of these graphics objects are typically composed of triangles that are themselves divided into spans, each span corresponding to a matrix of pixels. For example, a span may be composed of 16 pixels arranged in a (4×4) matrix. The individual sections of a pipelined graphics processor may process data on a span-by-span basis.

Pipelined graphics processors typically contain a texture engine for the purpose of applying textures to the surfaces of graphics objects. The individual components of a texture engine are usually arranged in a pipeline as well, thereby achieving additional efficiency. The final product of a texture engine consists of an output stream of "texels" corresponding to the picture elements of texture-mapped polygons.

For an extended treatment on methods of graphics visualization and texture mapping, see Foley, van Dam, et al., Computer Graphics—Principles and Practice (2d Ed. 1990 Addison Wesley, corr. 1995).

Multi-texturing is a general technique known in the art for blending textures together to create a multi-textured effect. Linear filtering and trilinear filtering are examples of multi-texturing techniques that blend adjacent levels of the same texture. As is also known, entirely different textures may also be blended to create a variety of visual effects.

A conventional single texture pipeline may implement texture blending by processing each texture one at a time, and then blending the results. In this single pipeline architecture, all of the memory requests associated with additional textures are issued after all of the memory requests have been issued for the first texture. The resulting textures are then combined in a separate blending stage. Because a texture blending unit may require the data from all component textures to be available at the same time, the texels of the first texture must be produced first and held in a buffer. When the texels of the remaining textures are produced, the final combined texture may be output by the texture blending unit by combining the buffered texels of the first texture with the produced texels of the remaining textures. Alternatively, the texels of the remaining textures may also be buffered before they are combined with the first texture. In a single pipeline architecture, because the individual textures are calculated serially, there is no need to synchronize or balance the processing of the multiple component textures.

To improve the processing speed of multi-texturing operations, separate texture pipelines may be configured to operate in parallel. In such a multiple texture pipeline architecture, each individual texture pipeline may operate independently and may request texel data from memory at its own pace. The data returning from memory may be stored in separate buffers corresponding to each texture pipeline. Because texture pipelines may work autonomously and may simultaneously process different textures, each having a different size and complexity, the output buffers for texture pipelines may fill up at different rates. In this situation, one output buffer may be full while another output buffer remains empty. Thus, where more than one texture is associated with a polygon and each texture is processed by a different texture pipeline, a deadlock condition may occur when one texture pipeline is waiting for a downstream texture blending unit to begin processing its buffered texture data, but the texture blending unit is unable to begin the next blending operation because the buffer for another texture pipeline does not yet contain the required texture data. The deadlock is created when the first texture pipeline, which is waiting for its output buffer to be cleared by the texture blending unit, issues a successful memory request. Under these conditions, this memory request will never complete. Because the first texture pipeline's output buffer is full (and cannot empty because the texture blending unit is waiting for data from another texture pipeline), its data returning from memory cannot be stored. At the same time, the other texture pipelines cannot proceed because there is an outstanding memory request from the first texture pipeline that is currently being served. Closing the deadlock is the texture blending unit, which cannot proceed because it does not have the necessary data from all required texture pipelines to begin the blending operation.

Accordingly, there is a need in the art for a technique to balance and synchronize the operation of parallel texture pipelines to improve processing efficiency and to prevent deadlock conditions. More specifically, there is a need in the art for a technique to arbitrate and balance the memory requests issued by parallel texture pipelines in a multiple pipeline texture engine. Finally, there is a need in the art to synchronize the operation of parallel texture pipelines while also permitting unsynchronized memory requests to be satisfied if the requested data resides in cache memory.

DETAILED DESCRIPTION

Embodiments of the present invention provide a mechanism for balancing and synchronizing the memory requests issued by parallel texture pipelines. According to an embodiment, the mechanism ensures that, as polygon textures are processed by a multiple pipeline texture engine operating in multiple texture mode, all of the memory requests associated with a portion of a given graphics texture are issued by all active pipelines before any one active pipeline may issue a memory request for another portion of a graphics texture. When the texture engine operates in single texture mode, an embodiment of the invention processes all texel memory requests as they are received. However, when the texture engine operates in multiple texture mode, a texture memory arbitrator processes received texel memory requests as long as the requests refer to data within a current texel span. If, in multi-texture mode, a texture pipeline requests texel data that falls outside of the current texel span, the texture memory arbitrator may stall the data request until all active pipelines complete all of their requests for data residing within the current texel span. This process provides for more efficient use of the texture engine by balancing and synchronizing texel data requests made by all active texture pipelines, thereby enabling a downstream texel blending unit to begin combining generated textures at the earliest possible moment. Additionally, because the texel data requests are balanced and synchronized across texture pipelines, deadlock conditions that may otherwise delay a texel blending unit are eliminated. An embodiment further permits a texture pipeline to issue unsynchronized memory requests if the requested data resides in cache memory, thus improving overall memory access performance.

Embodiments of the present invention contemplate the integration of multiple texture pipeline components constructed according to architectures that are known in the art. Additionally, the design of the present invention may be used cooperatively with known architectures and interfaces. For convenience and ease of illustration, several embodiments of the present invention describe only two component texture pipelines. Without loss of generality, it can be appreciated that multiple texture pipelines are covered by these teachings and fall within the spirit and scope of the appended claims.

Figure 1:
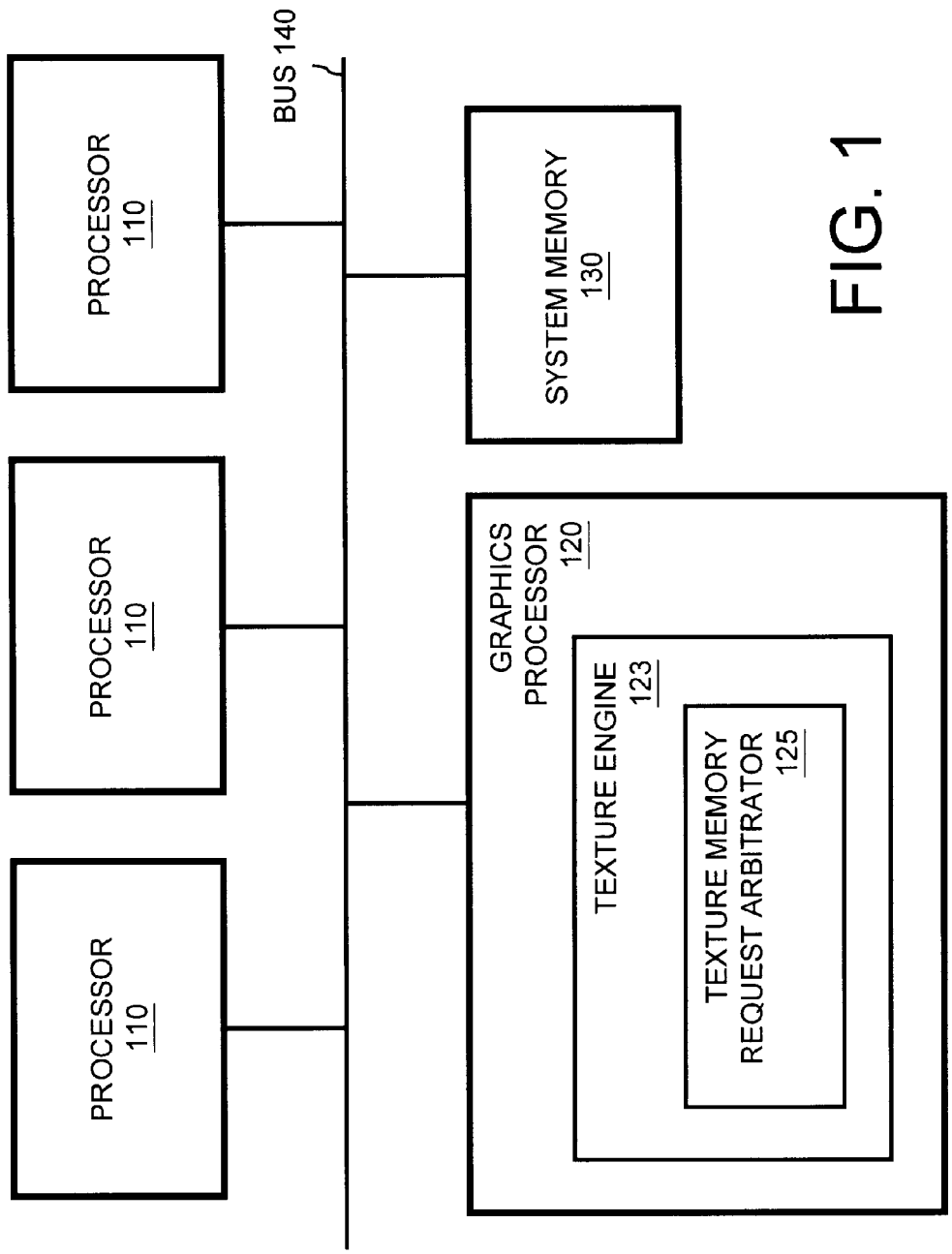
FIG. 1 is a high-level block diagram a computer system incorporating a computer graphics device having a texture memory request arbitrator in accordance with an embodiment of the present invention.

FIG. 1 is a high-level block diagram of a computer system incorporating a computer graphics device having a texture memory request arbitrator in accordance with an embodiment of the present invention. The system may include a bus 140 in communication with various processors 110, a system memory module 130, and a computer graphics device 120 incorporating a texture engine 123 having a texture memory request arbitrator 125 according to embodiments of the present invention.

Figure 2:
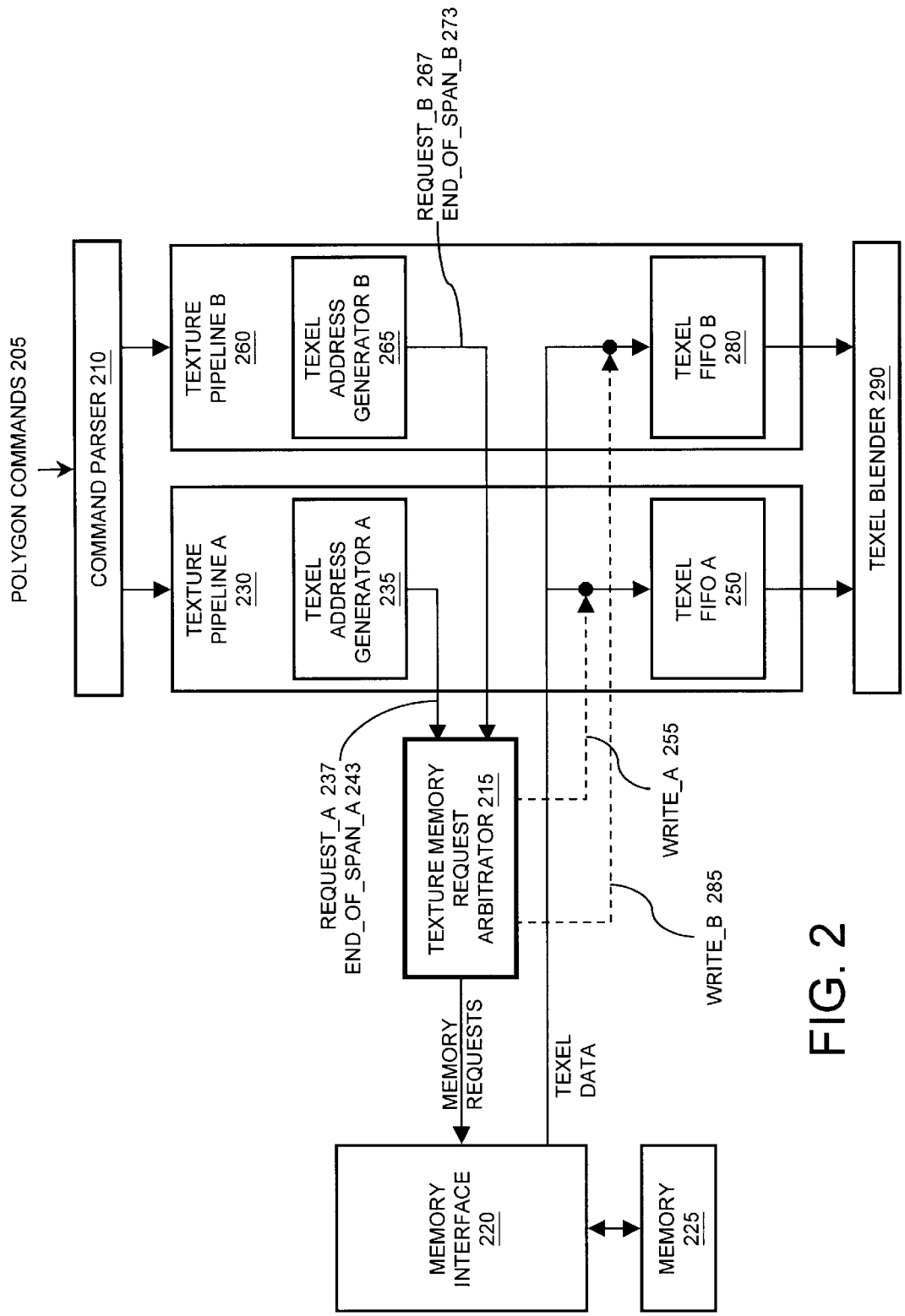
FIG. 2 is a block diagram of a multiple texture pipeline incorporating a texture memory request arbitrator according to an embodiment of the present invention.

FIG. 2 is block diagram of a multiple pipeline texture engine incorporating a texture memory request arbitrator according to an embodiment of the present invention. The texture engine may include a command parser 210, a pair of texture pipelines A 230 and B 260, a texture memory request arbitrator 215, a memory interface 220, a memory 225, and a texture blender 290 that is supplied with texel data by a pair of first-in-first-out (FIFO) buffers A 250 and B 280. The command parser 210 may receive polygon commands 205 and may in turn supply processed forms of these commands to the pair of texture pipelines A 230 and B 260. The command parser 210 may also simultaneously supply polygon color data to a color interpolator (not shown). As textures are applied to a polygon by the texture engine, texel address generator A 235, located within texture pipeline A 230, may issue a request for texel data 237 to the texture memory request arbitrator 215. Similarly, when a multi-texture effect is required, texel address generator B 265, located within texture pipeline B 260, may issue a request for texel data 267 to the texture memory request arbitrator 215. The texture memory arbitrator 215 may forward the texel data requests to a memory interface unit 220, which controls access to physical memory 225 where texel data is stored. When the memory interface unit 220 retrieves requested texel data, the data is routed to the appropriate texel FIFO buffer A 250 or B 280, according to whether texel address generator A 235 or texel address generator B 265, respectively, requested the data. Texel FIFO A 250 and texel FIFO B 280 in turn supply the texel blender 290 with retrieved texel data. The texel blender 290 combines the texel data from each texture pipeline with color data supplied by the color interpolator (not shown) to produce the final texture.

According to an embodiment, each graphics object may be composed of triangles that are each divided into spans corresponding to a fixed-sized matrix of pixels. Texture pipelines A 230 and B 260 may each process texel data on a span by span basis. As each texture pipeline completes the processing for a span, it may indicate an end-of-span condition to the texture memory request arbitrator 215. Thus, when texture pipeline A 230 completes a span, the texel address generator A 235 may send an end of span A indication 243 to the texture memory request arbitrator 215. Similarly, when the texture engine operates in multi-texture mode and texture pipeline B 260 completes a span, texel address generator B 265 may send an end of span B indication 273 to the texture memory request arbitrator 215.

To balance and synchronize the operation of the two texture pipelines A 230 and B 260 when the texture engine operates in multi-texture mode, the texture memory request arbitrator 215 works to ensure that all memory requests for a given graphics object span have been issued by both texture address generators A 235 and B 265 before a memory request for a new span will be allowed to proceed. In this manner, all of the texel memory requests for a current span, whether they are issued by texture address generator A 235 or B 265, are grouped together by the texture memory request arbitrator 215. In multi-texture mode, texel memory requests associated with subsequent spans are deferred by the texture memory request arbitrator 215 until all outstanding texel memory requests for the current span have been issued. As long as texel FIFO buffers A 250 and B 280 are large enough to hold at least one span of texel data, potential deadlock conditions will be averted, because the memory requests for all spans associated with a multi-texture effect will be grouped together and processed to completion before a new span is allowed to proceed.

According to another embodiment, the texture memory request arbitrator 215 may keep track of requested data returning from the memory interface unit 220. Signals WRITE_A 255 and WRITE_B 285 may be employed by the texture memory request arbitrator 215 to indicate when the returning data should be routed to texel FIFO buffer A 250 or texel FIFO buffer B 280, respectively. Thus, when texel address generator A 235 issues a request for data to the texture memory request arbitrator 215, the texture memory request arbitrator 215 may energize signal WRITE_A 255 to cause the returning data to flow correctly to texel FIFO A 250. Similarly, with respect to texture pipeline B 260, the texture memory request arbitrator 215 may respond to a memory request made by texture address generator B 265 by energizing signal WRITE_B 285 to cause the data returning from the memory interface unit 220 to flow correctly to texel FIFO B 280.

Figure 3:
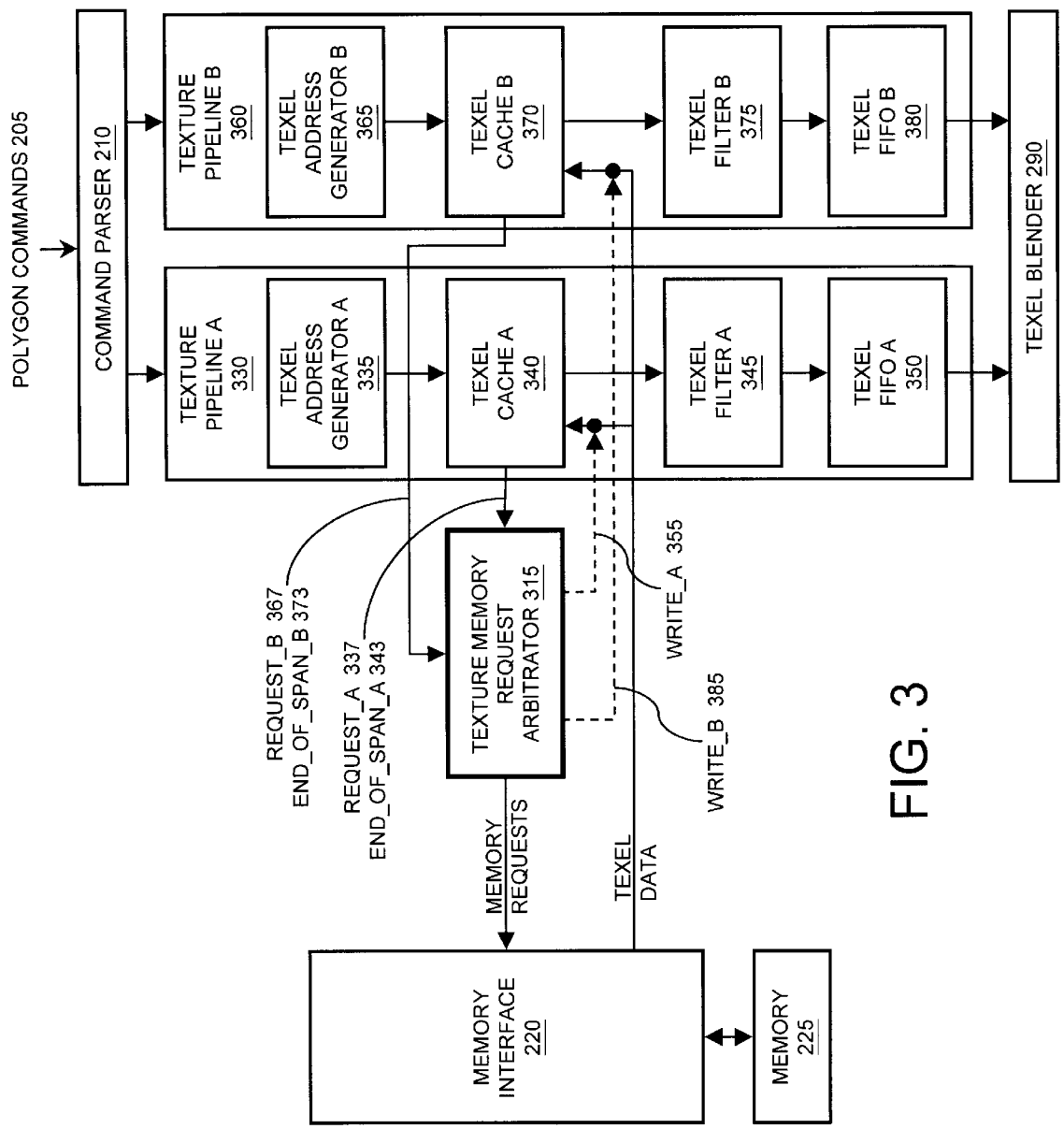
FIG. 3 is a block diagram of a multiple texture pipeline incorporating a texture memory request arbitrator having a cache memory, according to another embodiment of the present invention.

FIG. 3 is a block diagram of a multiple texture pipeline incorporating a texture memory request arbitrator having a cache memory, according to a further embodiment of the present invention. The texture engine may include a command parser 210, a pair of texture pipelines A 330 and B 360, a texture memory request arbitrator 315, a memory interface 220, a memory 225, and a texture blender 290. As discussed with respect to FIG. 2, the command parser 210 may receive polygon commands 205 and may in turn supply processed forms of these commands to texture pipelines A 330 and B 360. As textures are applied to a polygon by the texture engine operating in multi-texture mode, texel address generators A 335 and B 365 may issue independent requests for texel data. However, according to the embodiment illustrated in FIG. 3, memory requests first may be issued to texel cache units 340 and/or 370, rather than directly to the texture memory request arbitrator 315. If a texel cache unit is able to satisfy a memory request itself, it may do so. If, on the other hand, requested texel data does not reside in a cache unit, the memory request may be forwarded to the texture memory arbitrator 315. Thus, with respect to FIG. 3, texel address generator A 335 may issue texel data requests to the texel cache A 340. If the requested texel data resides in texel cache A 340, the data is forwarded to texel filter A 345. Otherwise, if the requested texel data does not reside in texel cache A 340, the memory request 337 is forwarded to the texture memory request arbitrator 315. Similarly, when the texture engine operates in multi-texture mode, texel address generator B 365 may issue texel data requests to the texel cache B 370. If the requested texel data resides in texel cache B 370, the data may be forwarded to texel filter B 375. Otherwise, if the requested texel data does not reside in texel cache B 370, the memory request 367 may be forwarded to the texture memory request arbitrator 315. As the texture pipelines A 330 and B 360 complete the processing for a span, they may each indicate an end-of-span condition to the texture memory request arbitrator 215, whether or not the requested data corresponding to the span resided in cache units. Thus, when texture pipeline A 330 completes a span, texel cache A 340 may send an end of span A indication 343 to the texture memory request arbitrator 315. Similarly, when texture pipeline B 360 completes a span, texel cache B 370 may send an end of span B indication 373 to the texture memory request arbitrator 315.

The texture memory request arbitrator 315 may forward received texel data requests to a memory interface unit 220, which controls access to physical memory 225 where texel data is stored. When the memory interface unit 220 retrieves requested texel data, the data are routed to the appropriate texel cache A 340 or B 370, which initially forwarded the request. Because the texture pipelines do not modify texel data, but instead use texel data on a read-only basis to generate new texels for application to selected polygons, the same texel data may reside in more than one cache. When texel cache unit A 340 receives texel data from memory interface unit 220, it may first copy the received texel data into internal cache storage. Following this, the texel cache unit A 340 may then forward the received texel data to texel filter A 345, which may perform further processing on the texel data before passing the texel data on to texel FIFO A 350. Similarly, when texel cache unit B 370 receives texel data from memory interface unit 220, it may first copy the received texel data into internal cache storage. The texel cache unit B 370 may then forward the received texel data to texel filter B 375, which may perform further processing on the texel data before transmitting it to texel FIFO B 380. Texel FIFO A 350 and texel FIFO B 380 supply the texel blender 290 with received texel data. The texel blender 290 combines the texel data from each texture pipeline with color data supplied by the color interpolator (not shown) to produce the final texture.

According to yet another embodiment, the texture memory request arbitrator 315 may keep track of requested data returning from the memory interface unit 220. Signals WRITE_A 355 and WRITE_B 385 may be employed by the texture memory request arbitrator 315 to indicate when the returning data should be routed to texel cache A 340 or texel cache B 370, respectively. Thus, when texel cache A 345 issues a request for data to the texture memory request arbitrator 315, the texture memory request arbitrator 315 may energize signal WRITE_A 355 to cause the returning data to flow correctly back to texel cache A 340. Similarly, with respect to texture pipeline B 360, the texture memory request arbitrator 315 may respond to a memory request made by texel cache B 370 by energizing signal WRITE_B 385 to cause the data returning from the memory interface unit 220 to flow correctly to texel cache B 370.

In one embodiment, the texel filters A 345 and B 375 may receive texel data from either the memory interface unit 220 or from the respective texel cache units A 340 and B 370. In another embodiment, texel data retrieved from the memory interface unit 220 may be transmitted to a requesting texel cache unit A 340 or B 370, where it may be held until the all of the data associated with the current span is required, at which point the data will be transmitted in burst to the corresponding texel filters A 345 or B 375.

Figure 4:
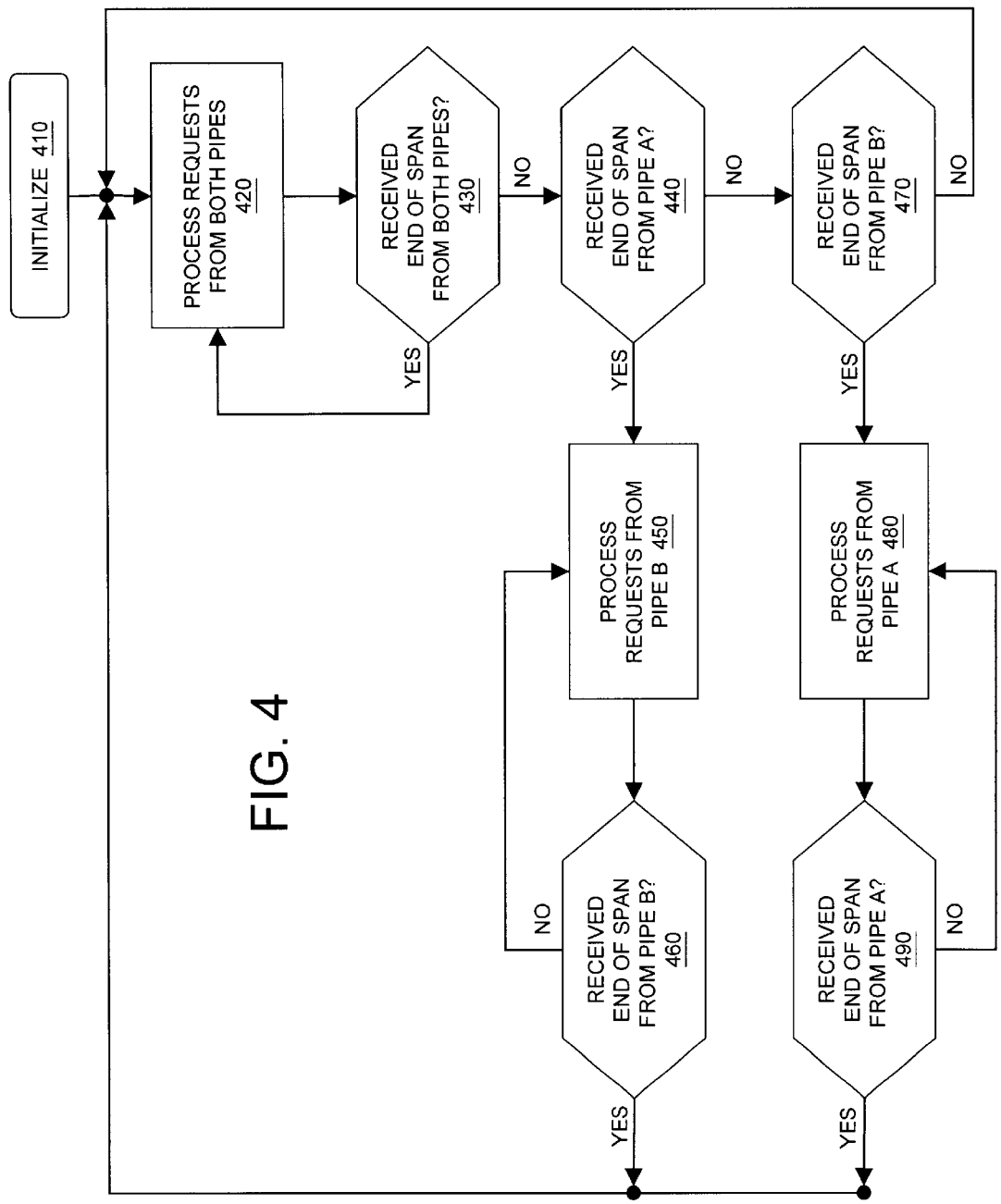
FIG. 4 is a flow diagram illustrating the texture memory arbitrator control logic according to an embodiment of the present invention.

FIG. 4 is a flow diagram illustrating the texture memory arbitrator control logic according to an embodiment of the present invention. The operation may begin when the texture memory request arbitrator is initialized (410). When the texture engine is in multi-texture mode, the texture memory request arbitrator may process memory requests received from both texture pipelines (420). If the arbitrator receives end of span indications from both pipelines simultaneously (430), the arbitrator may continue to process memory requests from both texture pipelines (420). Instead, if the arbitrator only receives an end of span indication from texture pipeline A (440), then it may only process requests received from texture pipeline B (450) until the arbitrator receives an end of span indication from texture pipeline B (460). Similarly, if the arbitrator only receives an end of span indication from texture pipeline B (470), then it may only process requests received from texture pipeline A (480) until the arbitrator receives an end of span indication from texture pipeline A (490).

Continuing to refer to FIG. 4, when the arbitrator is processing requests from only one texture pipeline (450 or 480), requests that are received from other texture pipelines will be stalled until the appropriate end of span indications are received (460 or 490). A "stall" may merely be a delay in completing the current request. Alternatively, a "stall" may correspond to a deferred request, requiring the requesting texture pipeline to reissue the request.

Figure 5:
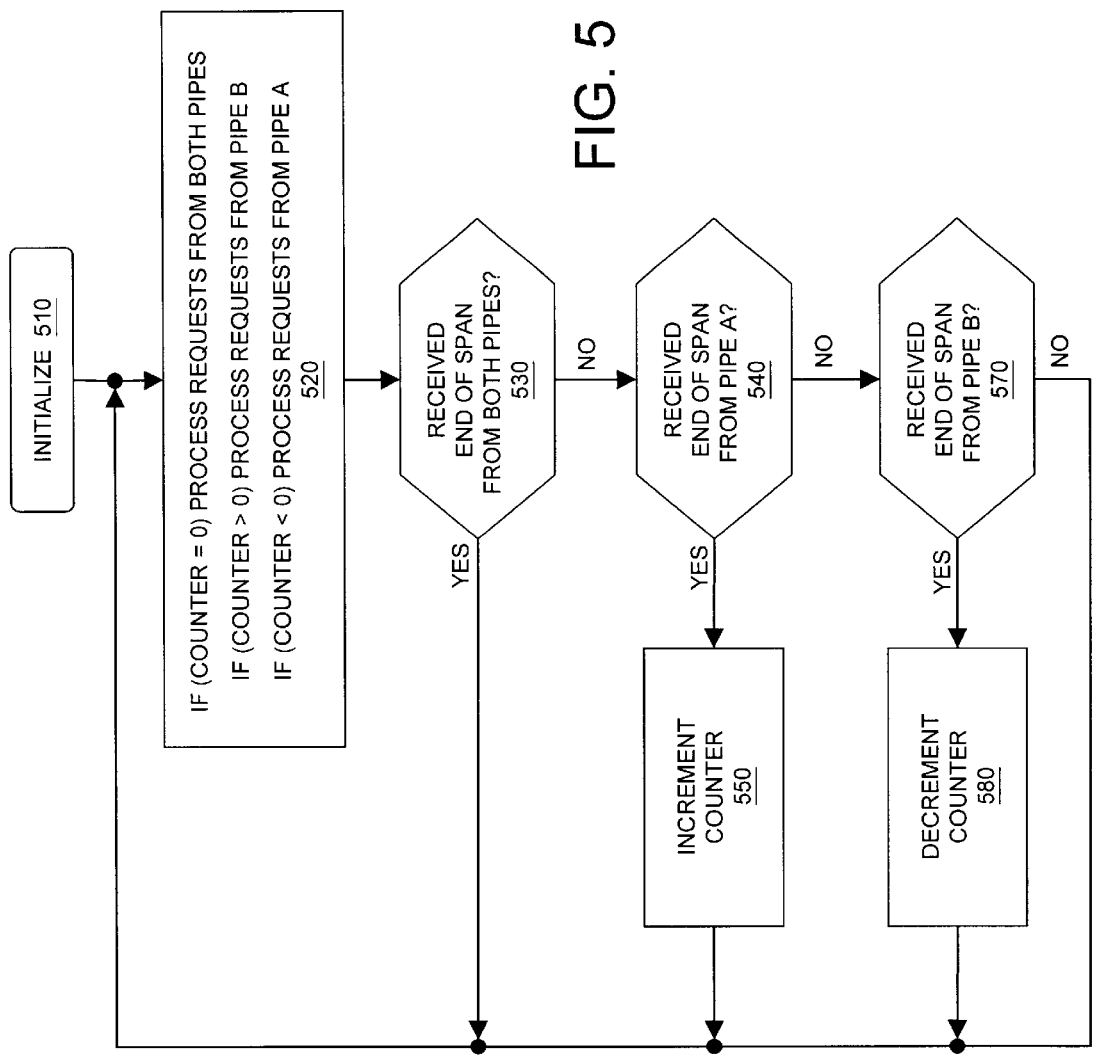
FIG. 5 is a flow diagram illustrating the texture memory arbitrator control logic according to another embodiment of the present invention.

FIG. 5 is a flow diagram illustrating the texture memory arbitrator control logic according to another embodiment of the present invention. According to this embodiment, a counter is employed to indicate the extent to which one texture pipeline is ahead of another one when the texture engine operates in multi-texture mode. When the operation is initialized (510) and begins executing, the value of the counter may determine whether the arbitrator will process memory requests from texture pipeline A or texture pipeline B. If the counter equals zero, the arbitrator may process requests received from either texture pipeline (520). Alternatively, if the counter is greater than zero, the arbitrator will only process requests received from texture pipeline B (520). Similarly, if the counter is less than zero, the arbitrator will only process requests received from texture pipeline A (520). End of span indications may be received at any time from any texture pipeline. If end of span indications are received substantially simultaneously from both texture pipelines (530), the value of the counter is not changed. However, if an end of span indication is received only from texture pipeline A (540), the value of the counter will be incremented (550). Alternatively, if an end of span indication is received only from texture pipeline B (570), the value of the counter will be decremented (580).

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A texture pipeline synchronization system, comprising:
 a plurality of texture pipelines each having outputs for memory requests and status indicator signals;
 a texel blend unit coupled to terminal ends of the texture pipelines;
 a memory interface unit; and
 a texture memory request arbitrator in communication with the outputs from the plurality of texture pipelines, the memory interface unit and the texel blend unit;
 the memory request arbitrator to grant memory requests from the pipelines, the memory request arbitrator to deny memory requests from one of the texture pipelines after having received a status indicator signal until the memory request arbitrator receives status indicator signals from the remaining pipelines.

2. The texture pipeline synchronization system of claim 1, wherein the texture pipelines each comprise a plurality of pipe sections, one of which is a texel address generator, and the memory arbitrator is coupled to the texel address generators.

3. The texture pipeline synchronization system of claim 1, wherein the texture pipelines each comprise a plurality of pipe sections, one of which is a texel address generator, another of which is a texel cache coupled to the texel address generator, and the memory arbitrator is coupled to the texel caches.

* * * * *